United States Patent

[11] 3,628,379

| [72] | Inventor | Momir Babunovic |
| | | Des Peres, Mo. |
| [21] | Appl. No. | 29,993 |
| [22] | Filed | Apr. 20, 1970 |
| [45] | Patented | Dec. 21, 1971 |
| [73] | Assignee | Barry-Wehmiller Company |
| | | St. Louis, Mo. |

[54] CONTAINER COMPRESSIVE LOAD-TESTING APPARATUS
8 Claims, 4 Drawing Figs.

[52] U.S. Cl..................................................... 73/94,
209/79, 241/99
[51] Int. Cl..................................................... G01n 3/08
[50] Field of Search............................................ 73/94, 41,
45, 45.1, 93, 90; 209/79; 241/99

[56] References Cited
UNITED STATES PATENTS
| 301,031 | 11/1961 | Rowe ........................ | 73/45 |
| 2,309,231 | 1/1943 | Bagley ....................... | 75/45.3 |

FOREIGN PATENTS
| 927,641 | 5/1963 | Great Britain............... | 73/94 |

*Primary Examiner*—Richard C. Queisser
*Assistant Examiner*—Marvin Smollar
*Attorney*—Gravely, Lieder & Woodruff ABSTRACT: Apparatus for subjecting frangible containers to an axial compressive load for a short period of time to determine the strength thereof and suitability for commercial use. The apparatus comprises a conveyor to properly space containers, register each container with a load-applying head, and prevent the collapse of a container from causing damage to adjacent containers.

CONTAINER COMPRESSIVE LOAD-TESTING APPARATUS

BRIEF DESCRIPTION OF THE INVENTION

This invention relates to apparatus for testing a container's ability to withstand a compressive load.

It is important to determine the strength of containers to axial loading as the commercial handling of frangible containers involves the stacking of cases of containers in pallet loads. If the containers are not sufficiently strong, cracks, chips and more serious damage will occur, all to the hazard of the consumer and possible loss of the contents.

The presently improved apparatus is arranged as a unit to be inserted in a conveyor system at any convenient zone prior to filling or other processing operations. An object is to handle a stream of containers so the containers are rapidly spaced just prior to axial load-testing, whereby the load-applying heads are easily registered with the containers and no interference or damage to adjacent containers can occur. Other objects will appear from the description of a preferred form of the apparatus which operates to remove the containers from a conveyor system, subject each container to an axial load test, and return the containers to the conveyor. The load test zone of the apparatus is arranged to be remote from the conveyor so that broken container particles may be cleared quickly so as not to block the flow of containers through the test zone.

As will hereafter appear, the present apparatus may comprise an endless conveyor having container-positioning cups thereon, means engaged with the conveyor to define an arcuate path of cup travel in which the cups become spaced apart, load-applying means movable along the arcuate path, means to drive the endless conveyor and move said load-applying means in timed relation to register said load-applying means with the containers in said conveyor cups, at least in said arcuate path of cup movement, and means adjacent said arcuate path to operate said load-applying means to assert a compressive load upon the containers.

It is also contemplated that the present invention may comprise in combination with an existing container conveyor system, load-testing apparatus mounted on a stand adjacent the container conveyor and operative to divert containers laterally from the conveyor, pass the containers through a testing zone and return the containers to said conveyor, with load-applying means operatively supported in the stand so as to be movable into registration with the containers and to impose a load on the containers while in the load-testing path and thereafter to release the containers for return to the container conveyor.

DESCRIPTION OF THE DRAWINGS

A preferred form of the present invention is shown in the accompanying drawings, wherein.

DESCRIPTION OF THE APPARATUS

Figure 1:
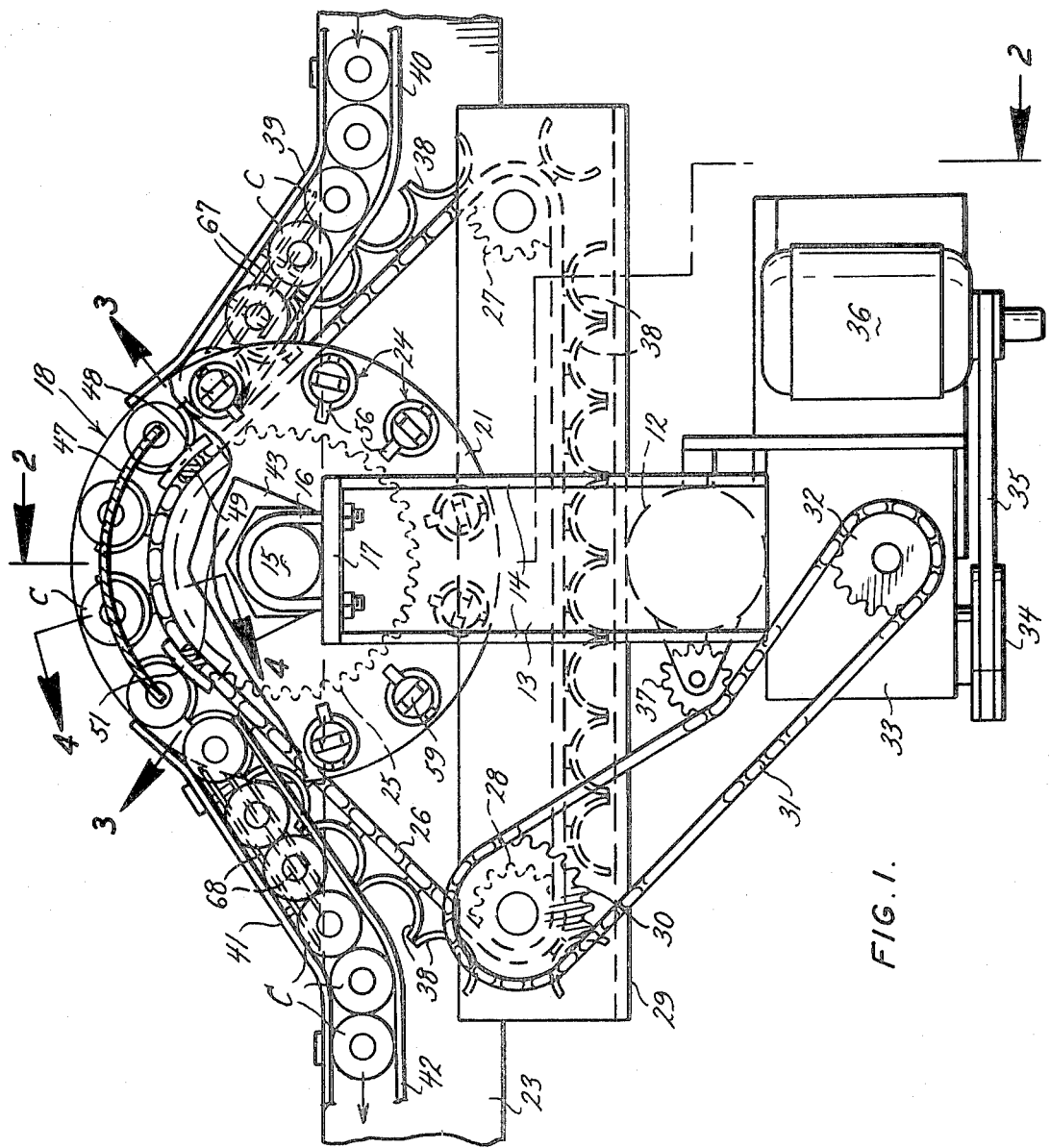
FIG. 1 is a top plan view of the apparatus as it is applied to a conveyor system for moving containers into and out of the test zone.
Figure 2:
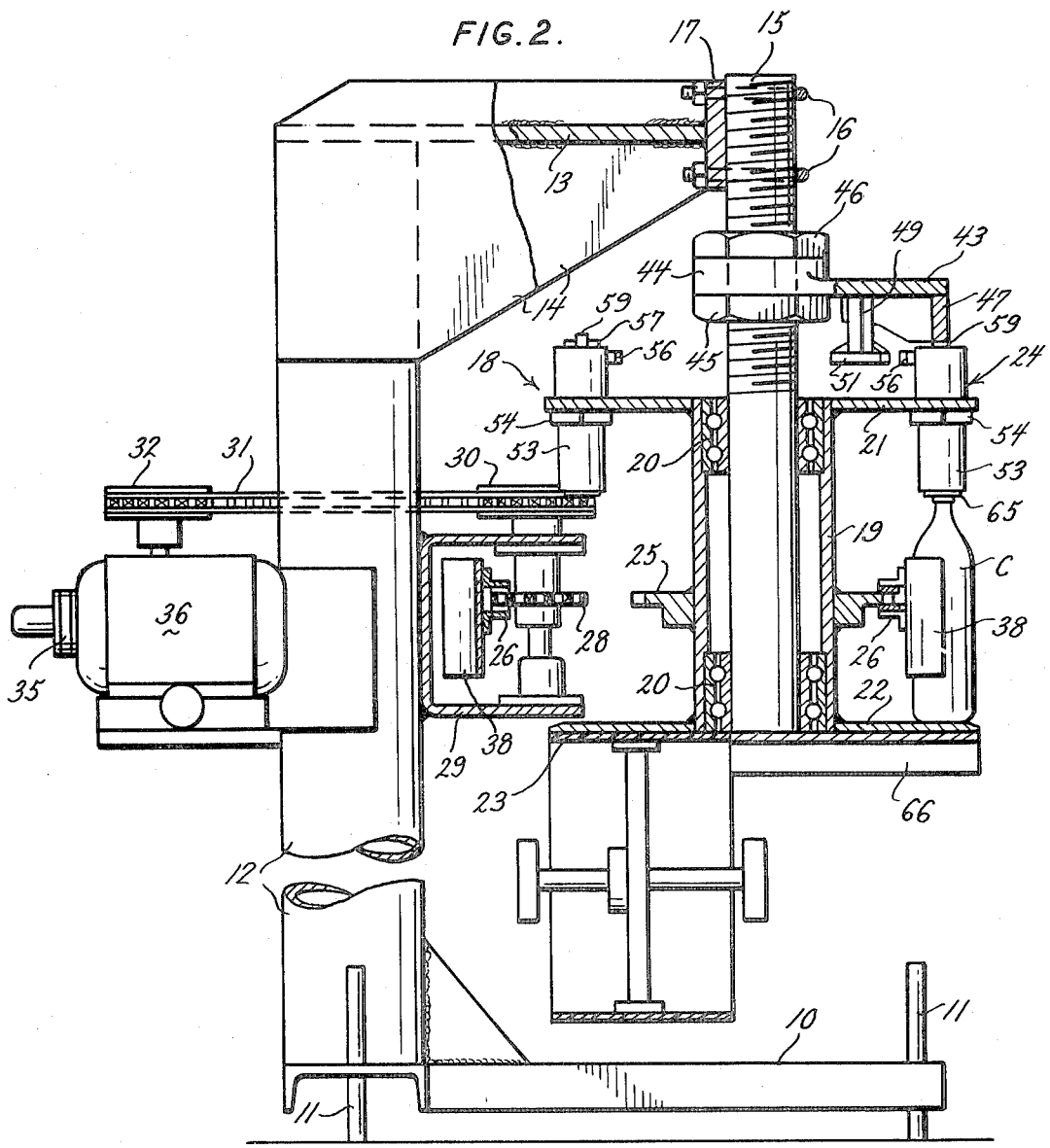
FIG. 2 is a sectional elevational view of the apparatus taken at line 2—2 in FIG. 1, illustrating the principles of the invention.

In FIGS. 1 and 2 a presently preferred form of apparatus includes the unitary organization of the parts on a stand or floor-supported base 10, having adjustable legs 11 for purposes of leveling the vertical column 12 on which the operating components are mounted, and to adjust the height of the components off the floor. A rigid arm 13, braced at 14 at the top of the column, projects outwardly to support a vertically pendant post 15 by means of U-bolts 16 and a clamping plate 17 which prevents turning of the post 15.

The pendant portion of post 15 carries a spool head 18 having a central sleeve 19 mounted in axially spaced bearings 20, and top and bottom horizontal plates 21 and 22 which are capable of remaining rigid and substantially unyielding under the test loads. The bottom plate 22 supports the base of the containers C during the testing cycle, and between loading and unloading from the conveyor 23 the containers move or slide over appropriately shaped and supported dead plates (not shown). The top plate 21 of the spool head 18 supports a plurality of load-applying heads 24, one of which will be described in FIG. 4.

The rotation of the spool head 18 is obtained by mounting a sprocket 25 on the sleeve 19 and engaging a chain 26 on the sprocket. The chain extends about two other sprockets 27 and 28 mounted in a supporting channel-shaped frame 29 rigidly carried on the column 12 and extending horizontally at the elevation of the plate 22 of the spool head 18. The sprocket 27 acts as an idler while sprocket 28 is carried on a shaft which supports a driven sprocket 30. The latter sprocket 20 is connected by a drive chain 31 extending to the power takeoff sprocket 32 of a gear unit 33. The gear unit 33 receives its drive through a sprocket 34 and chain 35 connected to the motor 36. The drive chain 31 is prevented from rubbing on the column 12 by an idler sprocket 37 attached to the column as shown in FIG. 1.

In FIGS. 1 and 2 it is seen that the sprocket chain 26 carries a plurality of container cups 38 that are adjacent each other while the chain moves in a linear path, but which cups 38 spread out as they traverse the periphery of the sprocket wheel 25. In the example shown the cups spread out to a spacing of about 30° on centers which means that it is possible to mount 12 load-applying heads 24 on the pool plate 21.

The conveyor 23 has its horizontal top surface pass through the apparatus under the pendant post 15 so that containers C thereon will move into the aisle between the fences 39 and 40 and crowd into the area where each cup 38 can engage one container and move it into registration with a 30 head 24. As the load test is completed, each container moves into the control of guide fences 41 and 42 at the exit side and are propelled away by the conveyor 23.

Figure 4:
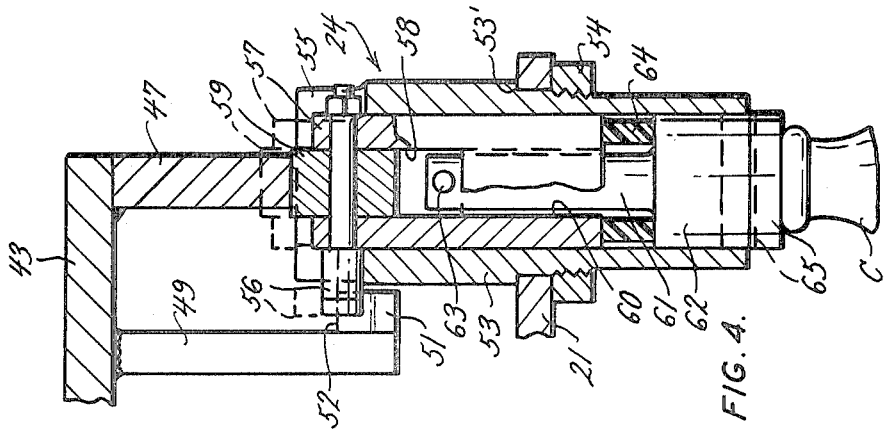
FIG. 4 is a partial sectional view of a typical load-applying head, the view being taken at line 4—4 in FIG. 1.
Figure 3:
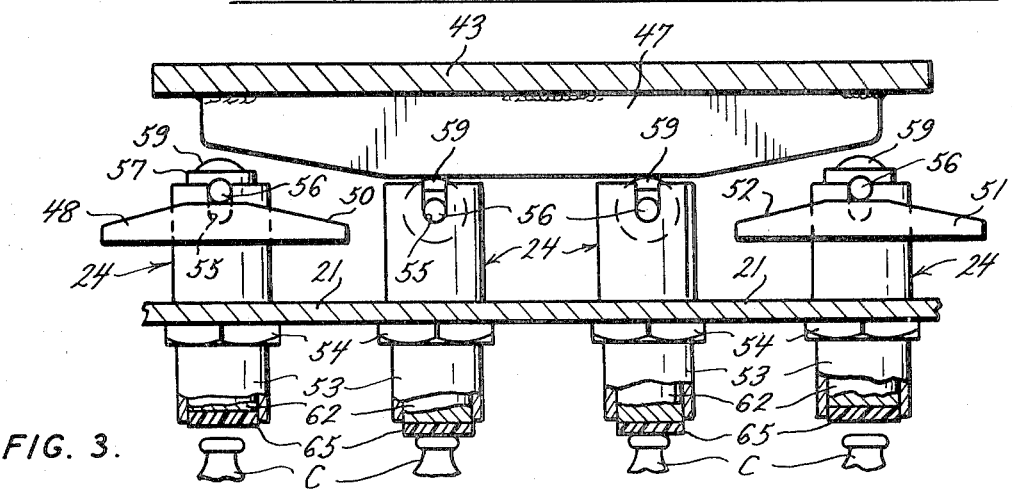
FIG. 3 is a fragmentary elevational view of the apparatus as seen along the line 3—3 in FIG. 1.

Turning now to FIGS. 2, 3 and 4, it is seen that the post 15 is provided with a support 43 that has its hub 44 captured between a pair of nuts 45 and 46 threadedly mounted on the post. The nuts 45 and 46 are provided to permit locating the support 43 in a position such that a force-applying cam 47 may be properly located relative to the path of travel of the load-applying heads 24. It is evident that the cam 47 is shaped to the curvature of the container travel around the sprocket 25, or more precisely to the curvature of the path taken by the cups 38. The engagement of each head 24 with the containers is effected by a loading cam 48 supported from the means 43 such that it is spaced inwardly relative to the cam 47. Similarly an unloading cam 51 is mounted on an arm 49 such that it is spaced inwardly relative to cam 47. Cam 48 is supported like cam 51 on an arm 49 (not shown).

If FIG. 4 there is shown a typical load-applying head 24 in which a tubular sleeve 53 is supported by its shoulder 53' in an aperture in plate 21 of the spool head 18. A nut 54 threaded on the sleeve 53 retains the sleeve in position. The upper open end of the sleeve 53 has aligned diametrically opposite slots 55 to receive a lifter pin 56 which extends through the upper end portion of a piston 57. The lifter pin 56 extends through a slot 58 in the piston 57 and acts as a shaft for a roller element 59. The piston 57 has an axial bore 60 aligned with the slot 58. The bore 60 receives the stem 61 of a ram 62, and a locking pin 63 in the end of the stem retains the ram 62 connected to the piston 57. The ram is spaced below the piston 57 so that a resilient element 64 may be mounted between the piston and ram. The element 64 may be a spiral spring, but it is preferred to employ a block of resilient material such as Urecon which is a urethane material having the properties suitable for this purpose. The lower face of the ram 62 is provided with a pad 65 to seat firmly upon the mouth of a container.

OPERATION OF THE APPARATUS

The apparatus is constructed to be positioned adjacent the conveyor 23 at any convenient station, and the adjusting legs 11 are set so the bottom plate 22 of the spool head 18 is substantially at the plane of the conveyor surface. Suitable support means 66 are provided to carry the fences 39 and 40 in position to guide the row of containers into the vertical space between the plates 21 and 22 of the spool head 18. The slight change in elevation from conveyor 23 to the bottom plate 22 is compensated for by proving sloped grid bars 67 at the feed-in side and similar grid bars 68 at the feed-out side. These bars are supported with fences 39 and 41. Each container is captured in a cup 38 of the conveyor chain 26 so it is suitably spaced to register under a load-applying head 24. As each head 24 reaches the zone of registration with a container C, the lifter pin 56 engages the cam 48 and the head is raised momentarily to allow the plunger 62 to be raised so the mouth of the container C aligns with the end recess 65.

The lifter pin 56 moves down the runoff ramp 50 (FIG. 3) and allows the ram recess 65 to engage over the container C. As this operation is completed the cam follower roller element 59 engages the cam 47 and the piston 57 is forced downwardly in the sleeve 53 to load the plunger 62. The shape of the cam 47 moves the piston down a distance which by predetermined calculation exerts a force on the resilient element 64 which results in loading the container C with a force necessary to test the strength of the container. In the zone of load testing of each container C the fence 39 and fence 41 is interrupted to afford an area for clearing the container fragments should the loading cause collapse of the container.

The axial loading of each container C is effected in at least the arc of travel of the spool head 18 through 30°. At the end of this travel the lifter pin 56 engages the lifting ramp 52 of cam 51 and the plunger 62 is lifted above the container so the mouth thereof is released from the recess 65. This action occurs simultaneously with the container reaching the fence 41 and its cooperating fence 42. Thus the container C is returned to the conveyor 23 and moves on to the next operation.

The motor 36 for driving the cup chain 26 is adjusted to move the cups 38 in timed relation with the conveyor 23 so excessive pressure on the feed of containers C into the testing zone is avoided. The axial loading of each container C may be adjusted by raising or lowering the cam 47 through manipulation of nuts 45 and 46.

What is claimed is:

1. Container load-testing apparatus comprising an endless conveyor having container-positioning cups thereon, means engaged with said conveyor to define an arcuate path of cup travel in which the containers are spaced apart, a container support surface movable with said conveyor into position to receive and support the bottom of the containers to be load-tested, a plurality of load-applying head means movable in said arcuate path above said support surface, means to drive said endless conveyor and move said head means in timed relation to register said head means with the top of the containers in said conveyor cups in said arcuate path in position to engage successive ones of said head means and exert a yieldable compressive load through said head means upon successive containers supported on said support means and engaged by said load-applying means.

2. The apparatus of claim 1 in which each of said load-applying head means includes a container-engaging element, a load-transmitting element, and resilient means between said elements to limit the load imposed on each container moved in said arcuate path.

3. The apparatus of claim 2 in which said elements and resilient means of each head means are mounted in a sleeve, and said resilient means is a body of resilient material normally holding said elements spaced from each other and yielding to load applied on said transmitting element.

4. Apparatus to test frangible containers for resistance to axial compressive load comprising a rotary head having spaced top and bottom plates rotating about a common vertical axis, a series of individual load-applying means carried by said top plate in circumferentially spaced relation, conveyor means movable about said axis of the rotary head and having container-engaging pockets which on traversing said axis spread out to load containers onto said bottom plate in registration successively with said load-applying means, first means operable engaged by successive load-applying heads to lift each head and deposit it on a container, second means operably engaged by successive load-applying heads to exert an axial compressive load through said heads upon the containers, and third means operably engaged by said successive load-applying heads to lift each head and release the containers therefrom.

5. The apparatus of claim 4 including a force-applying member in each load-applying head, a piston engaged at one side of said force-applying member and adapted to successively engage said first, second and third means to displace said piston, and plunger means engaged at the opposite side of said force-applying means and adapted to seat upon the containers.

6. The apparatus of claim 4 wherein said force-applying member is formed of resilient material responsive to displacement of said piston and acting to apply a predetermined load upon said plunger in proportion to piston development.

7. The combination with a container conveyor, of compressive load-testing apparatus comprising: a stand disposed adjacent said conveyor and having a container support surface; and endless conveyor operatively carried by said stand and defining container diverting and return paths and an intervening load-testing path directed over said container support surface; container cups on said endless conveyor, means adjacent said diverting and return paths to direct the containers respectively from said conveyor into said cups for support by said container support surface and from said cups back to said conveyor; containers load-testing means operatively carried by said stand; and means connected to said endless conveyor and load-testing means to operate both in timed relation whereby to register said testing means with the containers supported by said support surface in said cups in the path of cup movement diverted from said conveyor, to release said testing means from registration with the containers in said return path of cup movement, and to actuate said testing means to impose a compressive load on the containers supported on said support surface while moving through said testing path.

8. The combination of claim 7 wherein said means connected to said endless conveyor and load-testing means includes motor-driven means for said endless conveyor and load-testing means to move the same together and stationary cam means in the path of movement of said load-testing means to actuate the latter means successively to register, load-test and release the containers.

* * * * *

UNITED STATES PATENT OFFICE
CERTIFICATE OF CORRECTION

Patent No. 3,628,379        Dated  December 21, 1971

Inventor(s)   Momir Babunovic

It is certified that error appears in the above-identified patent and that said Letters Patent are hereby corrected as shown below:

Col. 2, line 19, after "sprocket" (second occurrence) and before "is", the numeral "20" should read "30".

Col.,2, line 38, after "a" and before "head", the numeral "30" should be deleted and the phrase --"load applying" substituted therefor.

Col. 4, line 18, at the beginning of the line, cancel "operable" and substitute therefor -- "operably".

Col. 4, line 32, after "claim", cancel the numeral "4" and substitute therefor -- "5".

Col. 4, line 35, at the end of the line, cancel "development" and substitute therefor -- "displacement".

Col. 4, line 39, at the beginning of the line cancel "and" and substitute therefor "an".

Signed and sealed this 13th day of June 1972.

(SEAL)
Attest:

EDWARD M. FLETCHER, JR.
Attesting Officer

ROBERT GOTTSCHALK
Commissioner of Patents